(12) United States Patent
Froman et al.

(10) Patent No.: US 7,225,057 B2
(45) Date of Patent: May 29, 2007

(54) VIRTUAL DIAL IRRIGATION CONTROLLER

(75) Inventors: Yigal Froman, deceased, late of Ramat Hasharon (IL); by Hedna Froman, legal representative, Ramat Hasharon (IL); Darren L. Redetzke, Shakopee, MN (US); Peter D. Moeller, Saint Louis Park, MN (US); Kenneth E. Kline, Redlands, CA (US)

(73) Assignee: The Toro Company, Bloomington, MN (US)

( * ) Notice: Subject to any disclaimer, the term of this patent is extended or adjusted under 35 U.S.C. 154(b) by 483 days.

(21) Appl. No.: 10/714,320

(22) Filed: Nov. 14, 2003

(65) Prior Publication Data

US 2006/0184284 A1    Aug. 17, 2006

Related U.S. Application Data

(60) Provisional application No. 60/426,548, filed on Nov. 15, 2002.

(51) Int. Cl.
   *G05D 7/00*   (2006.01)
(52) U.S. Cl. .................. 700/284; 700/15; 700/16; 700/17; 239/69
(58) Field of Classification Search ............... 700/283, 700/284, 14, 15, 16, 17, 18, 19; 239/63, 239/67, 68, 69, 70
See application file for complete search history.

(56) References Cited

U.S. PATENT DOCUMENTS

| | | | |
|---|---|---|---|
| 3,869,854 A | 3/1975 | Church | |
| 4,090,764 A | 5/1978 | Malsby et al. | |
| 4,152,750 A | 5/1979 | Bremenour et al. | |
| 4,242,721 A | 12/1980 | Krolak et al. | |
| 4,569,020 A | 2/1986 | Snoddy et al. | |
| 4,672,510 A | 6/1987 | Castner | |
| 4,852,051 A | 7/1989 | Mylne, III | |
| D306,575 S | 3/1990 | Brundisini | |
| 4,922,407 A | 5/1990 | Birk et al. | |
| 4,937,732 A | 6/1990 | Brundisini | |
| 4,937,746 A | 6/1990 | Brundisini | |

(Continued)

OTHER PUBLICATIONS

The Strong Box, Stainless Steel Controller Enclosure, 10 pgs., V.I.T. Products, Inc., San Diego, CA.

(Continued)

*Primary Examiner*—Leo Picard
*Assistant Examiner*—Charles Kasenge
(74) *Attorney, Agent, or Firm*—Inskeep IP Group, Inc.

(57) ABSTRACT

The present invention includes an irrigation controller utilizing a "virtual" dial. In particular, the present invention contemplates an electronic programming and controlling interface that is controlled according to actuation of a simple on/off switch (i.e., a binary switch), preferably a push button. For example, in one embodiment, an irrigation controller is provided wherein a rotary dial is replaced with a circular liquid crystal display. The LCD contains segments peripherally on its screen that are energized according to the desired function selected by the user. The segment that is "on" at a particular time will correspond to visual indicia on the panel of the controller to inform the user which function is operable at that particular time. The user can then advance to the next segment on the LCD screen by pressing a button located elsewhere on the controller panel.

20 Claims, 7 Drawing Sheets

U.S. PATENT DOCUMENTS

| | | | |
|---|---|---|---|
| 5,101,083 | A | 3/1992 | Tyler et al. |
| 5,229,937 | A | 7/1993 | Evelyn-Veere |
| 5,251,153 | A | 10/1993 | Nielsen et al. |
| 5,262,936 | A | 11/1993 | Faris et al. |
| 5,265,005 | A | 11/1993 | Schmidt et al. |
| 5,272,620 | A | 12/1993 | Mock et al. |
| 5,278,749 | A | 1/1994 | De Man |
| 5,293,554 | A | 3/1994 | Nicholson |
| 5,381,331 | A | 1/1995 | Mock et al. |
| 5,410,717 | A | 4/1995 | Floro |
| 5,414,618 | A | 5/1995 | Mock et al. |
| 5,421,738 | A | 6/1995 | Roberts |
| 5,479,338 | A | 12/1995 | Ericksen et al. |
| 5,479,339 | A | 12/1995 | Miller |
| 5,602,728 | A | 2/1997 | Madden et al. |
| 5,748,466 | A * | 5/1998 | McGivern et al. ............ 239/70 |
| 5,834,693 | A | 11/1998 | Waddell et al. |
| 5,956,248 | A | 9/1999 | Williams et al. |
| 6,256,191 | B1 | 7/2001 | Curlee |
| 6,772,050 | B2 | 8/2004 | Williams et al. |

OTHER PUBLICATIONS

Rain Bird, Central Control System, Maxicom, Jun. 1994, pp. 2-8, Rain Bird Sales, Inc., Tucson, AZ.
Rain Bird, Components of the Maxicom System, Feb. 9, 1994, p. 3.2, Section 3, US.
Rain Bird, Central Control System, Maxicom—Guide to Operations, Feb. 1993, TOC and pp. 5.4-1-2;5.4-41-42;7.2-1-2; Rain Bird Sales, Inc., Tucson, AZ.
Rain Bird, Maxicom Guide to Operations, Oct. 1994, Chapter 7, US.
Rain Bird, Central Computer Control System, Maxicom, "Landscape Irrigation Products, 1993-1994 Catalog", pp. 98-99, US.
Toro, Motorola MIR 5000 Radio-Based Irrigation Central Computer Control System, 1991, pp. 1-4, The Toro Company, Riverside, CA.
Motorola, MIR5000 System Planner, Mar. 8, 1993, TOC and pp. 1-42, The Toro Company, Riverside, CA.
Motorola, Motorola MIR5000 System Features, Nov. 1991, 20 Pgs., San Diego Turf & Irrigation, San Diego, CA.
Motorola, Motorola MIR-5000 Component Descriptions, Feb. 16, 1993, 5 pgs., Megeath.
Motorola, New Members to the MIR5000 Family, Irrinet and Scorpio, 14 pgs., Toro, Riverside, CA.
Toro/Motorola, General Description—IRRInet, 24 pgs., Toro, Riverside, CA.
Motorola, IRRInet Owner's Manual, 1992, TOC and Secs. 1-3, Motorola Communications Israel Ltd., Tel Aviv, Israel.
Motorola, IRRInet Component Descriptions, Feb. 16, 10 Pgs., 1993, Megeath.
Motorola, Irrigation Field Unit Owner's Manual, TOC and Secs. 1-3, 1992, Technical Writing Services, Motorola, Inc., Schaumburg, IL.
Motorola, Scorpion AC, TOC and Secs. 1-3, Sep. 1994, Technical Writing Services, Motorola, Inc., Schaumburg, IL.
Motorola, IRRInet General Description Service Manual, 16 pgs., 1993, Technical Writing Services, Motorola, Inc., Schaumburg, IL.
Motorola Communications Sector, I/O Module 4 Digital Inputs/16 Solid-State Outputs, 1992, 12 pgs., Technical Writing Services, Motorola, Inc., Schaumburg, IL.
Motorola, MIR5000C Quickstart and Reference Guide, Feb. 1994, Technical Writing Services, Motorola, Inc., Schaumburg, IL.
Motorola, MIR5000C Central System Operating Instructions, 1991, Technical Writing Services, Motorola Communications Israel Ltd., Tel Aviv, Israel.
Motorola, MIR 5000C System Installation Section, 1989, Technical Writing Services, Motorola Communications Israel Ltd., Tel Aviv, Israel.
Koala-T Irrigation Controller Photos, P1010983 thru P1010989, Oasis Control Systems, Inc., Chatsworth, CA.
Expanded Light-Energized Installation, LEIT8000 Light Energized Irrigation Technology Control System Catalog, Jan. 1995, 1 page, SOLTROL (now DIG Corp.), USA.
Model 39624 Pedestal Mount Field Controller, Model 39625 Wall Mount Field Controller, Royal Coach/Buckner Catalog, Jan. 1983, 1 page, Litho, USA.
Sales Offices and Warehouses, Royal Coach/Buckner Catalog, Jan. 1983, 1 page, Sheet No. 280-286, Litho, USA.
Modular Solid State Controllers, Buckner Catalog, May 1990, 8 pages, USA.
Features and Functions of the 39824/5 Field Controller, Buckner Catalog, 5 pages, USA.
PTC82 Professional Turf Controller 12 and 18 Stations, Oasis Controls Specification Sheet, 2 pages, OSS-007A (SP), Philmac PTY LTD, USA.
PTC83 Professional Turf Controller 24, 30, 36, 42 Stations, Oasis Controls Specification Sheet, 2 pages, OSS-008A (SP), Philmac PTY LTD, USA.
Lanscaper Irrigation Controller 12 and 16 Stations, Oasis Controls Specification Sheet, 2 pages, OSS-005B, Philmac PTY LTD, USA.
PTC81 Professional Turf Controller 6 Stations, Oasis Controls Specification Sheet, 2 pages, OSS-006A (SP), Philmac PTY LTD, USA.
Researchers Develop Automated Surface Irrigation System, NTIS Tech Notes, 1995, 1 page, NTN83-0860, NTIS, US Dept of Commerce, USA.
Maxicom Computer Control System, Rain Bird Catalog, 1990, 4 pages, Rain Bird Sprinkler Mfg. Corp, USA.
Moody Automatic Controllers, Moody Catalog, 3 pages, Moody, USA.
Modular Series Electronic Controllers, Buckner Catalog, 3 pages, USA.
XKit Expander Module Kit (Series 8700), SOLATROL Catalog, Feb. 1995, 1 page, Solatrol Inc., USA.
LEIT 8000 Universal Control Unit (LEIT 8000-2), SOLATROL Catalog, Feb. 1995, 1 page, Solatrol Inc., USA.
Weather-matic 1990-91 Irrigation Equipment Catalog, 1990-91, 3 pages, Weather-matic, USA.
Irrigation Euipment Catalog, 1995, 5 pages, Buckner, USA.
1990 Irrigation Products, Toro Irrigation Products Catalog, 1990, 3 pages, Toro, USA.
Pro 8430, 8420 & Pro 8900 Series Controllers, Nelson Irrigation Corp. Catalog, 4 pages, USA.
Pro 8430 and 8420 Series Automatic Irrigation Controllers, L.R. Nelson Corp. Catalog, 1991, 2 pages, L.R. Nelson Corporation, USA.
The Toro Company, RJ4-Plus/RJ6-Plus, Indoor Dual Program Timer With Master Valve/Pump Start & Water Budgeting, Instruction Manual, 2001, pp. 1-11, Toro, Riverside, California.
"NMC-15 Advanced Fetigation Controller," brochure, undated, from http://www.netafim.com, Netafim Irrigation Systems, Tel Aviv, Israel.
"Netafim Drip Irrigation—Printable Version—NMC-15," specifications, undated, from http://www.netafim.com, Netafim Irrigation Systems, Tel Aviv, Israel.
"NMC-64 Advanced Irrigation, Fertigation & Climate Controller," brochure, undated, from http://www.netafim.com, Netafim Irrigation Systems, Tel Aviv, Israel.
"Netafim Drip Irrigation—Printable Version—NMC-64," specifications, undated, from http://www.netafim.com, Netafim Irrigation Systems, Tel Aviv, Israel.
"Netafim NMC-64 User/Installation Manual," undated, Netafim Irrigation Systems, Tel Aviv, Israel.

* cited by examiner

VIRTUAL DIAL IRRIGATION CONTROLLER

CROSS REFERENCE TO RELATED APPLICATIONS

This application claims priority to U.S. Provisional Application Ser. No. 60/426,548 filed on Nov. 15, 2002 entitled Virtual Rotary Dial Irrigation Controller, the entire contents of which are incorporated herein by reference.

FIELD OF THE INVENTION

The present invention relates to controllers and particularly to irrigation controllers.

BACKGROUND OF THE INVENTION

Most residences, office buildings, industrial complexes, golf courses, nurseries and the like include outdoor landscapes that contain grass, plants, trees, flowers etc. And in order to maintain such landscapes in an aesthetically (and safe) state, it is often necessary to ensure that such landscapes receive proper amounts of water at appropriate times of the day in particular seasons of the year.

Many users of these facilities seek to minimize the manpower necessary to ensure such proper watering schedules and do so through the use of irrigation controllers. Typically, such an irrigation controller is connected to a plurality of sprinkler assemblies located throughout a particular landscape and is then programmed so that the sprinklers are caused to go on and off at regulated times according to the programmed schedule.

The sophistication of irrigation controllers has advanced considerably over the years in response to rising demand and reliance by consumers on the advantages afforded by such irrigation controllers. This has led to increased complexity that can sometimes make the operation of an irrigation controller somewhat confusing and cumbersome. The numerous different variables that can now be adjusted in even the cheapest irrigation controller can make the programming step alone a challenging task for the user. Furthermore, due to the increased competition in the market of irrigation controllers, manufacturers are constantly seeking to introduce controller products that simplify the controller operation and yet still enable production in a cost effective manner.

One of the areas in irrigation controller design that lends itself to simplification without increasing costs or losing functionality is the elimination of rotary dials or switches that typically are used on the face of irrigation controllers. For example, many prior art controllers have a circular knob/switch on the controller face that, when rotated, adjusts the operation mode of the controller. At one location, the knob/switch may place the controller into a "time set" mode. At another location, the knob/switch may place the controller in a "manual" mode. Eliminating this knob/switch without losing the functionality of the knob/switch is desirable since it will reduce the costs of the controller and likely enhance its reliability.

SUMMARY AND OBJECTS OF THE INVENTION

The present invention seeks to exploit this improvement in irrigation control through the use of a "virtual" dial. In particular, the present invention contemplates replacing such a dial/knob/switch with an electronic interface that is controlled according to actuation of a simple on/off switch (i.e., a binary switch), preferably a push button. For example, in one embodiment, an irrigation controller is provided wherein a rotary dial is replaced with a circular liquid crystal display ("LCD"). The LCD contains segments peripherally on its screen that are energized according to the desired function selected by the user. The segment that is "on" at a particular time will correspond to visual indicia on the panel of the controller to inform the user which function is operable at that particular time. The user can then advance to the next segment on the LCD screen by pressing a button located elsewhere on the controller panel. Once the user has "completed the circle," the user will know that programming of the controller is complete.

In another embodiment, the dial/knob/switch can be replaced with a circular pattern of LED's. Again, each LED will correspond to a visual indicia on the controller panel such that the user will know which function of the "virtual" switch is operable as indicated by which LED is "on." When it is desired to move to the next function, the user will press a button located elsewhere on the panel so as to advance the virtual switch (i.e., advance to the next LED) to the next function.

Of course, the invention is not restricted to the using a circular pattern for the virtual switch. The pattern could be elliptical, square or any other shape or closed plane figure that seems appropriate for an intended user. However, circular is chosen for certain preferred embodiments since a circular shape seems to be appealing esthetically and intuitively to and well recognized by most users, particularly to the extent that "completing the circle" intuits to the user that the programming act is essentially complete.

Hence, it can be seen that it is an object of the invention to increase reliability of the invention by eliminating a rotary switch and replacing it with a virtual, electronic, dial which is operated or controlled according to a simple on/off (e.g., a binary) switch, preferably a push button.

It is a further object to maintain or increase the functionality of the switching component of the controller.

It is yet a further object of the present invention to simplify the operation of a controller to the user.

These and other objects not specifically enumerated here are also contemplated in the invention and will become evident upon further consideration of preferred embodiments.

DESCRIPTION OF THE PREFERRED EMBODIMENTS

Figure 1:
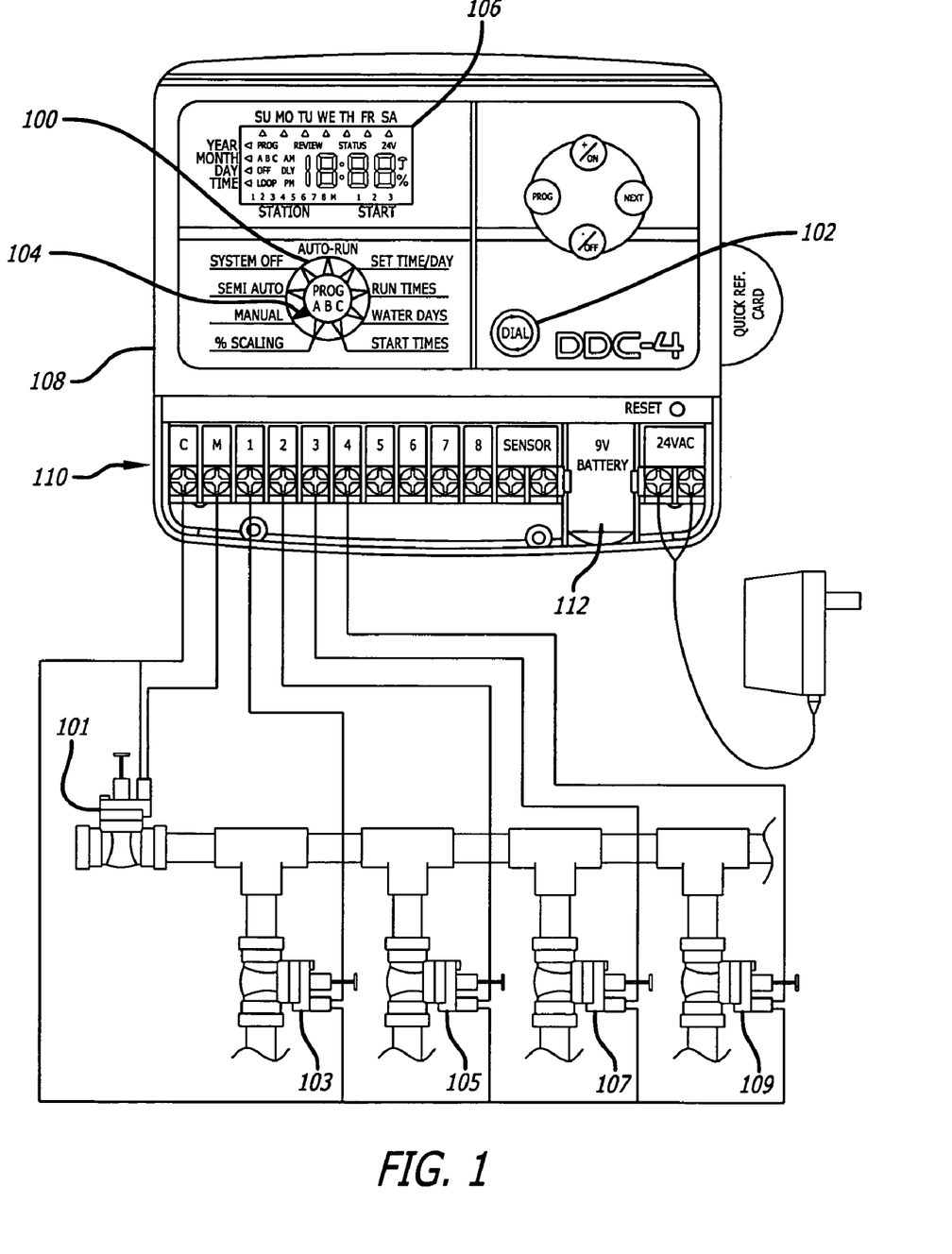
FIG. 1 is a plan view of one preferred embodiment of the present invention.

Referring to FIG. 1, a first preferred embodiment of the present invention is shown. This drawing shows the face of an irrigation controller 108 that has a virtual rotary dial 100 having the shape of a nine pointed star. Each arm 104 of the star is comprised of or part of a liquid crystal display, which, when energized, takes on an opaque color. When an arm 104 is opaque, this indicates that the controller 108 is in the mode that is identified on the controller face that corresponds to the opaque arm of the star. For example, when the arm 104 of the star near the words "Manual" is opaque, this means that the irrigation controller 108 is in the "manual" mode. It will be understood that the operational features of each of the modes of the irrigation controller 108 are known in the art.

In order to advance the virtual rotary dial to subsequent functions, the user presses the binary or on/off switch 102 located to the right of the virtual dial 100. With each actuation of the switch 102, a new arm 104 of the star will become energized and thereby indicate the function currently operative in the controller. At the same time the binary switch 102 is causing a subsequent arm 104 of the star to become opaque, it is also causing a change in the state of the programmed microprocessor internal to the controller so that it may receive commands from the user according to the function that corresponds to each arm 104 of the star as it becomes opaque.

The preferred embodiment of irrigation controller 108 contains a standard irrigation terminal 110 known in the art. In FIG. 1 this terminal is wired to a main irrigation valve 101 and secondary irrigation valves 103, 105, 107, 109. This configuration allows the irrigation controller 108 to control each valve by way of electrical signals determined by the irrigation watering program.

A 9V battery 112 may optionally be connected next to the irrigation terminal 110. This battery 112 allows for programming of the unit when the unit is not connected to standard AC power. When the unit is connected to such power, however, the 9V batter 112 is disconnected. There is also, however, a backup Li battery (not shown) located at the back of the P.C. Board of the controller. This battery ensures that programming is not lost in the event of a power failure.

Each irrigation controller 108 may have different operational capacity. For example, one of the controllers may be useful for up to 4 irrigation stations, another may be useful for up to 6 stations and another up to 8 stations. Of course, the invention could be utilized for a controller of any number of irrigation stations.

Figure 2:
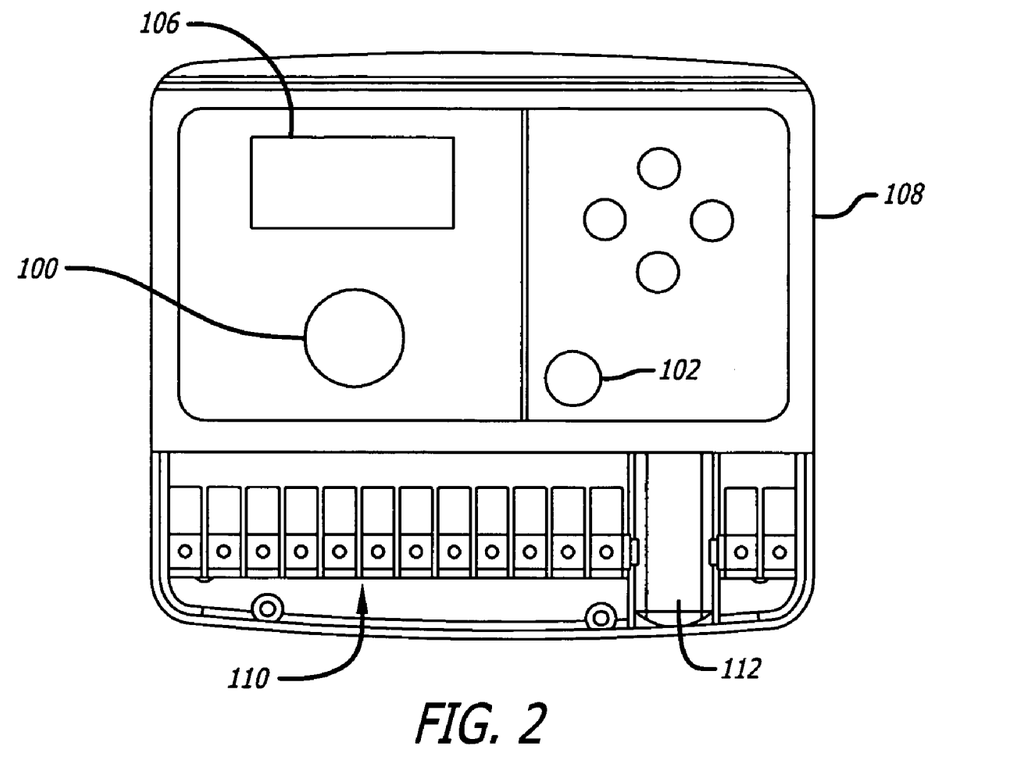
FIG. 2 is plan view of the embodiment shown in FIG. 1.

Referring to FIG. 2, there is shown a plan view of the embodiment depicted in FIG. 1. It has a front face that contains an LCD panel 106 displaying various information on the operation of the controller (time, day, station timing, etc.) as well as the LCD virtual dial display 100 discussed above. In these figures, the virtual dial display 100 appears circular (i.e., this figure does not show the nine point star shape discussed above), however, this is only because the virtual dial display 100 is not energized. When energized, virtual dial display will show the various arms 104 of the star.

Figure 9:
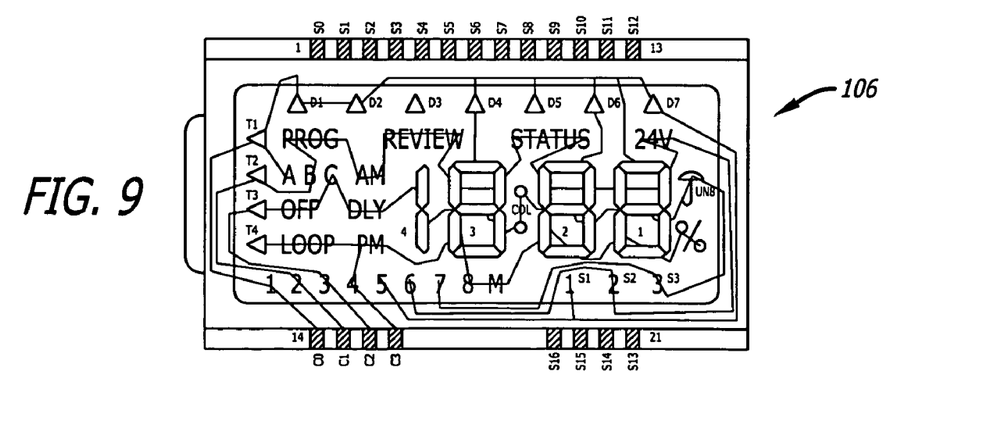
FIG. 9 is a schematic view of a preferred embodiment of an irrigation controller display in accordance with the present invention.

Referring to FIG. 9, the irrigation controller 108 of the present invention includes an LCD display 106, which, in a preferred embodiment, is located above the virtual dial 100. This display 106 is used to show the user various information necessary for the correct programming and operation of the controller. It is connected to a microprocessor (not shown) or other display driver in a manner known to those skilled in the art.

Figure 5:
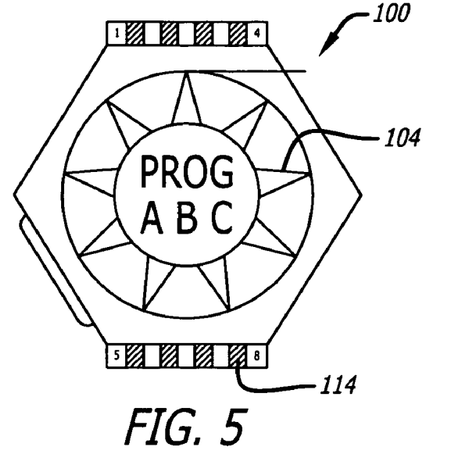
FIG. 5 is a plan view of a preferred embodiment of the virtual dial of the present invention.
Figure 6:
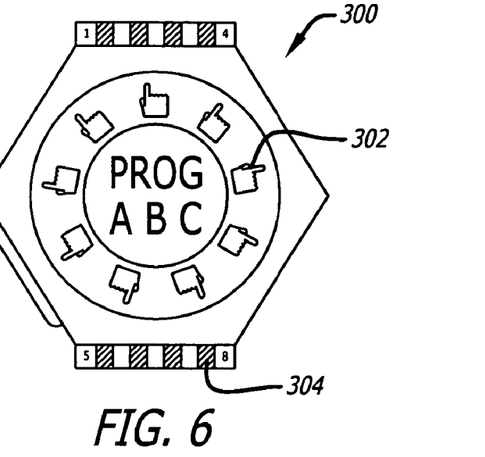
FIG. 6 is a plan view of another preferred embodiment of a virtual dial of the present invention.
Figure 7:
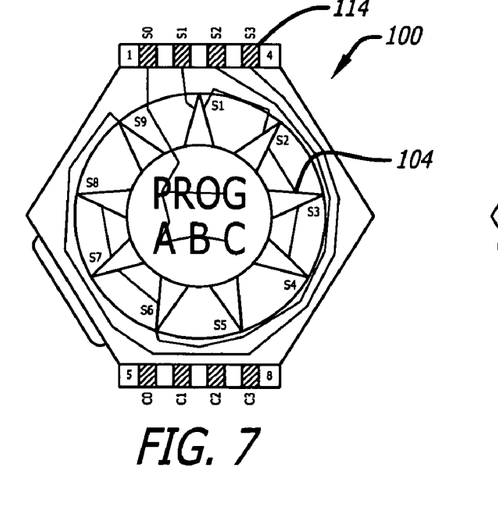
FIG. 7 is a schematic view of a preferred embodiment of the virtual dial in FIG. 5.
Figure 8:
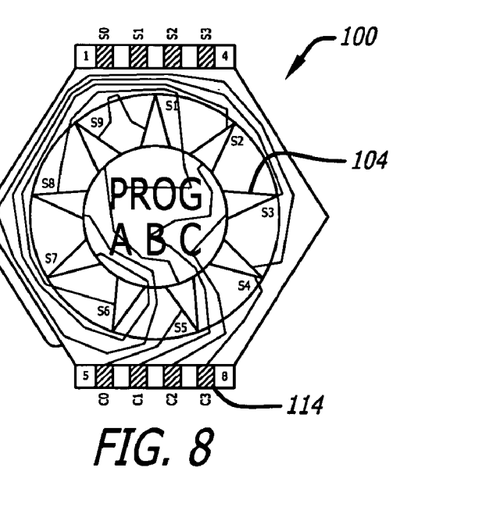
FIG. 8 is an alterative schematic view of a preferred embodiment of the virtual dial in FIG. 5.

FIGS. 5-8 show a virtual dial in accordance with a first preferred embodiment of the present invention as a unit separate from the controller itself. FIGS. 5, 7, and 8 illustrate the virtual dial 100 seen in FIGS. 1 and 2. These Figures also reflect the presence of the conduction pathways on the LCD substrate and which pathways are connected to electrical contacts 114 at either end of the LCD substrate.

The nine arms 104 or points of the star are self-evident. It can also be seen that the virtual dial includes various contacts 114 so that the virtual dial can be connected to the microprocessor or display driver. Such connections are made in a manner known to those skilled in the art.

FIG. 6 shows another embodiment of the virtual dial 300 in accordance with the present invention. In this embodiment, the nine points/arms of the star of the previous embodiment have been replaced with nine icons of a hand with an extended index finger. Such an icon may be more desirable to certain users than the points of a star. From this embodiment, it can be readily seen that are numerous ways in which to configure the virtual dial to achieve the goals of the virtual dial.

Figure 3:
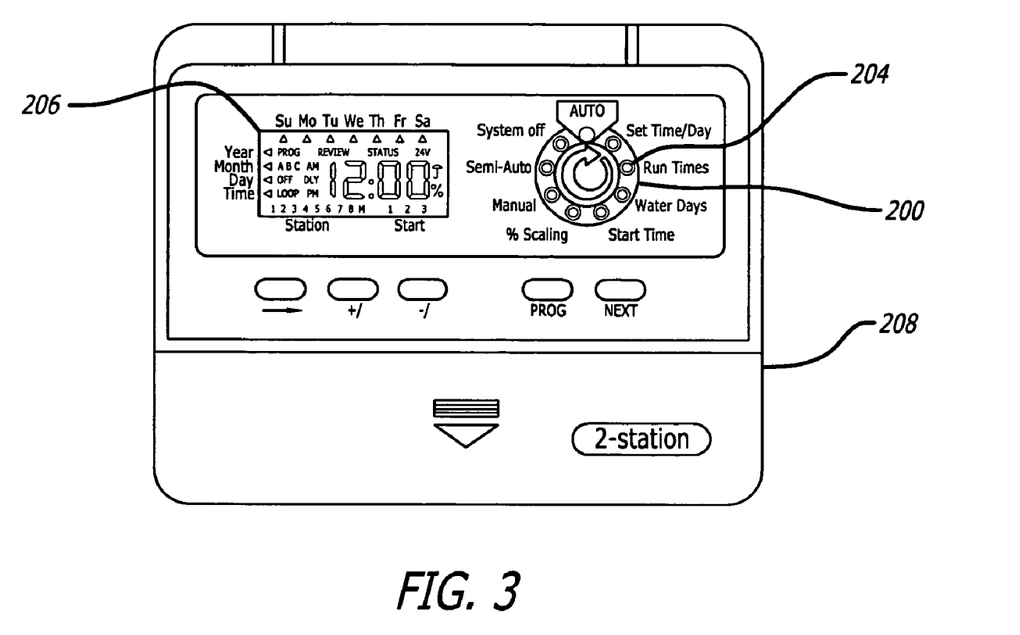
FIG. 3 is a plan view of another preferred embodiment of the present invention.
Figure 4:
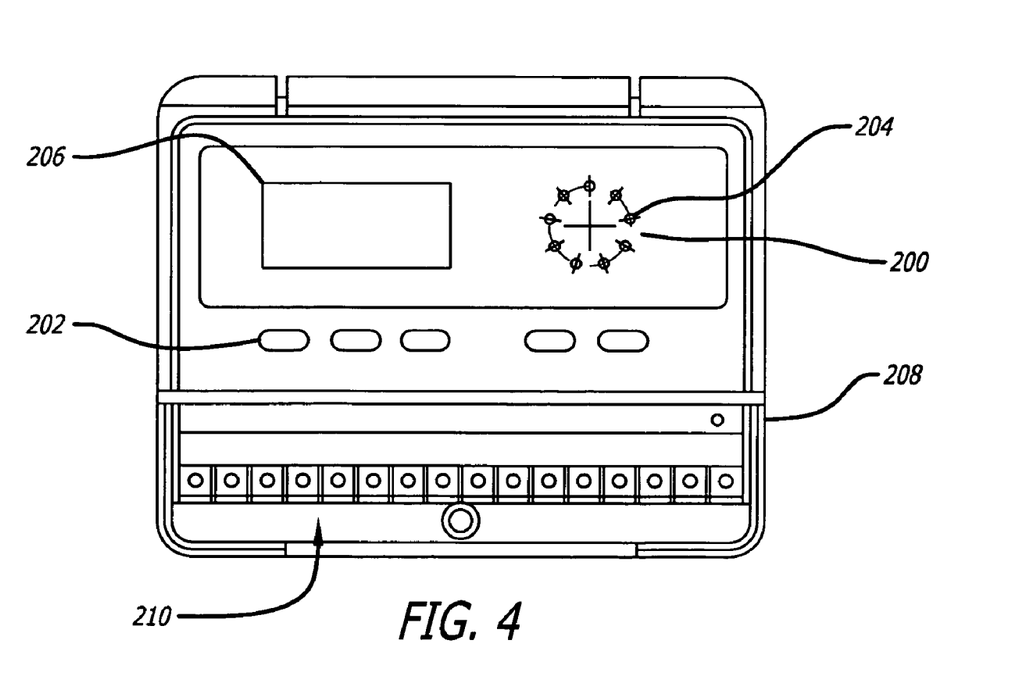
FIG. 4 is a plan view of the embodiment shown in FIG. 3.

FIGS. 3-4 show another preferred embodiment of an irrigation controller 208 in accordance with the present invention. In this preferred embodiment, the virtual dial is in the form of a circular series of light emitting diodes (LEDs) 204 as opposed to a series of arms 104 in a star shaped LCD module 100 as in the previous embodiment. In this embodiment the LEDs 204 function in a manner similar to the arms/points of the LCD insofar as an illuminated LED 204 signifies the operational mode of the controller 208 as being that mode that is identified at the corresponding location on the face of the controller 208.

In this regard, the leftmost switch 202 on the face of the controller 208, i.e., the one with a rightward facing arrow on it, serves a function analogous to the "dial" button 102 on the previous embodiment illustrated in FIGS. 1-2. By pressing this button 202, the microprocessor causes the next sequential LED 204 to illuminate and at the same time changes the operational mode of the controller 208 to the mode that is identified by the text on the controller face that corresponds to the LED 202 that is illuminated. In other respects, this embodiment operates in generally the same manner as the first preferred embodiment.

FIG. 4 shows a plan view of the housing associated with the embodiment of FIG. 3. One can readily see the virtual dial 200 (in the form of a series of LED's 204). One can also see that this controller 208 has a removable panel covering an irrigation station 210 so that the user may connect irrigation stations and otherwise utilize the features of the device.

Figure 10:
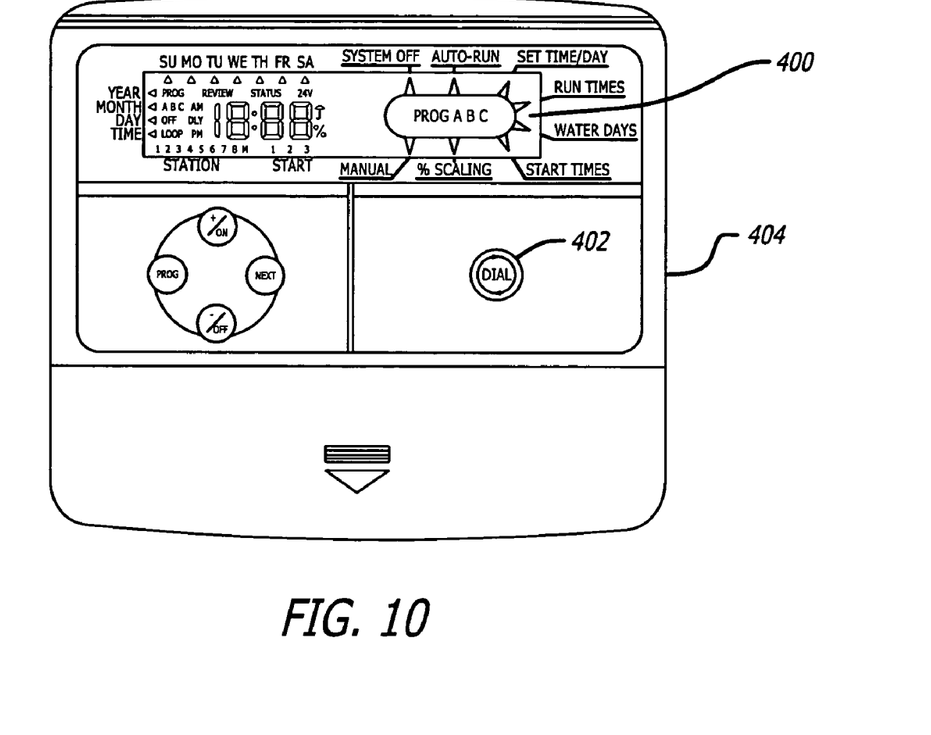
FIG. 10 is a plan view of a preferred embodiment of an irrigation controller with a single LCD display in accordance with the present invention.

FIG. 10 illustrates yet another embodiment of the present invention. An irrigation controller 404 utilizes a master display 400. The master display 400 integrates a virtual rotary dial display with numerical info, dates, and other operational data into one liquid crystal display. Although this information is integrated onto one LCD, the irrigation controller 404 functions in the same manner as previously disclosed embodiments.

In general, by pressing the pushbutton associated with the virtual dial (e.g., the "dial" button 102 in the embodiment of FIGS. 1-2 or the "arrow" button 202 in the embodiment of FIGS. 3-4), the mode of operation of the controller is advanced according to the indications of the virtual dial (e.g., either LCD 100 or LED 200). Next, the other buttons located on the controller (e.g., "prog, on, off, next") are variously used to make inputs and settings as required for a particular mode operation (as indicated by the virtual dial).

Figure 11:
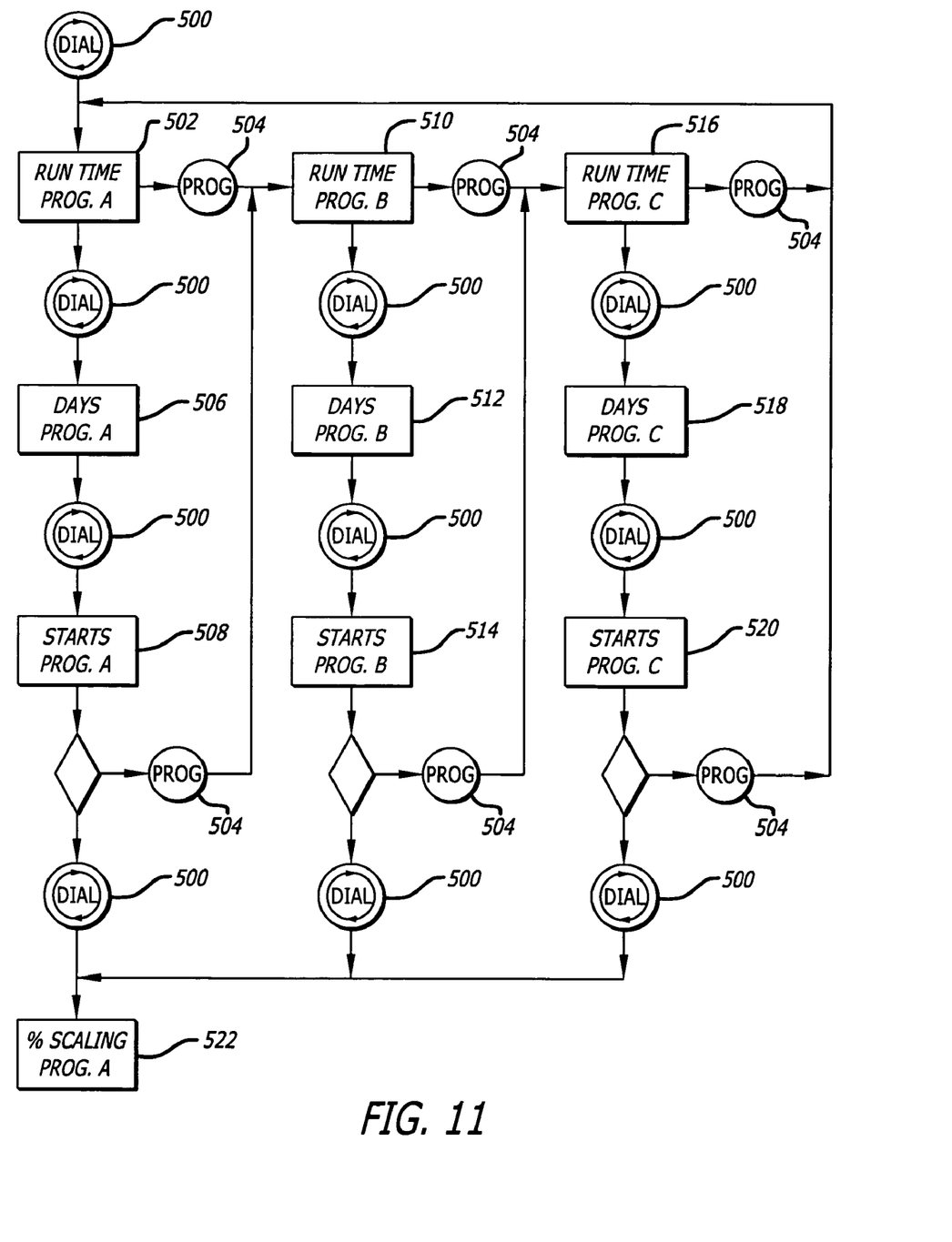
FIG. 11 is a block diagram of a programming aspect of an irrigation controller in accordance with a preferred embodiment of the present invention.

FIG. 11 illustrates a flow chart describing the use of the virtual dial for programming four irrigation parameters of the present invention: Run Time, Watering Days, Start Times, and % Scaling. Run Time determines the length of time the irrigation system is active. Watering Days controls which days of the week the controller 108 will activate the irrigation system. Start Times determines what time of the day the irrigation system will activate. Last, % Scaling allows for increasing or decreasing the Run Time of all stations in a program by percentage scaling. % Scaling is most often used to adjust watering for season precipitation differences.

First, the dial button 500 is pressed, allowing a user to find the first desired variable to program as displayed by the opaque arm 104 of virtual dial 100. In this case, that variable is Run Time.

A user then selects the desired program they wish to edit by pressing the program button 504. In the preferred embodiment illustrated in FIG. 11, the program button 504 selects from three independent programs, A, B, or C. This description will follow the path of program A.

Once program A is selected, the user enters a desired value by pressing the +/ON or −/Off buttons for the first station. Each press of these buttons increase or decrease the Run Time by 1 minute increments respectfully ranging from 1 hours to 4 hours. By pressing the Next button 526, a user advances to the Run Time for the next station. The Run Time values are similarly manipulated in 1 minute increments with the +/ON and −/OFF buttons. Unselected stations in a program will remain OFF. After the last station settings in Run Time is the Master Valve 101 settings. The display will show "ON" initially. To disable the master valve 101, −/OFF should be pressed. Pressing +/ON resumes the normal master valve 101 start operation.

Figure 14:
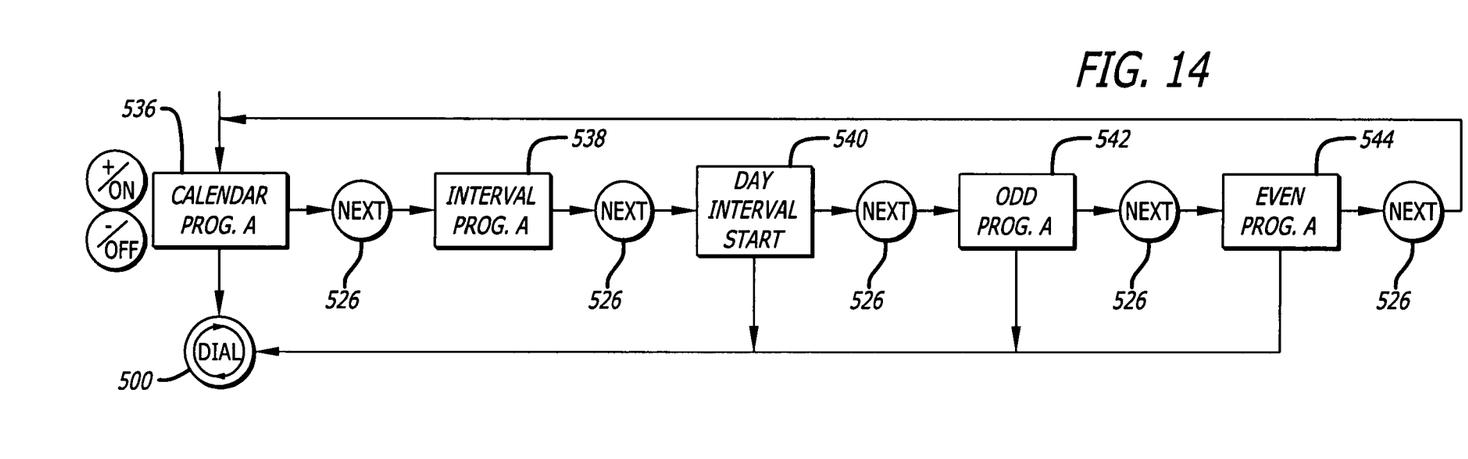

Next, a user presses the dial button 500 to move to the next variable, Watering Days, for program A 506. Once Watering Days for program A 506 is selected, five parameters become available to be set, as seen in the flow chart in FIG. 14. Again, the +/ON and −/OFF buttons may be used to manipulate the values for each parameter. Calendar Program A 536 is the first parameter, allowing a user to select days of the week to activate the irrigation system. Pressing the next 526 button brings the controller 108 to the interval program A 538 mode which allows a user to turn on the watering day interval. Pressing next 526 again brings the controller 108 into the Day Interval Start 540 mode where the user may designate the first day to start the interval watering. Pressing Next 526 once more allows a user to turn on the sprinklers for odd watering days, and pressing Next 526 once more allows a user to turn on the sprinklers for even watering days. Pressing Next 526 yet again brings the user back to the first Watering Days mode.

Referring once more to FIG. 11, the dial button 500 is pressed yet again to move controller 108 on to the next variable, Start Time for program A 508. Three start times are available for each program and may be cycled through using the next 526 button and set using the +/ON and −/OFF buttons. To reset the start times to OFF, the user can press the +/ON and −/OFF buttons until the display shows OFF.

Finally, the dial button 500 is pressed again, changing the parameter mode to % Scaling for program A 522. The % Scaling for program A 522 is a single parameter mode which can be altered with the +/ON and −/OFF buttons. The initial Run Time represents 100% with subsequent percentages ranging from 0% to 200%.

Programs B and C may be edited in a similar fashion to program A, as seen in FIG. 11, by pressing the program button at the end of each cycle or at any point in between. Thus, a user may easily switch between virtual dial modes of different programs in a straightforward and uncomplicated manner. Although four modes are illustrated, it is understood that an additional number of user defined modes are possible with the virtual dial 100.

Figure 12:
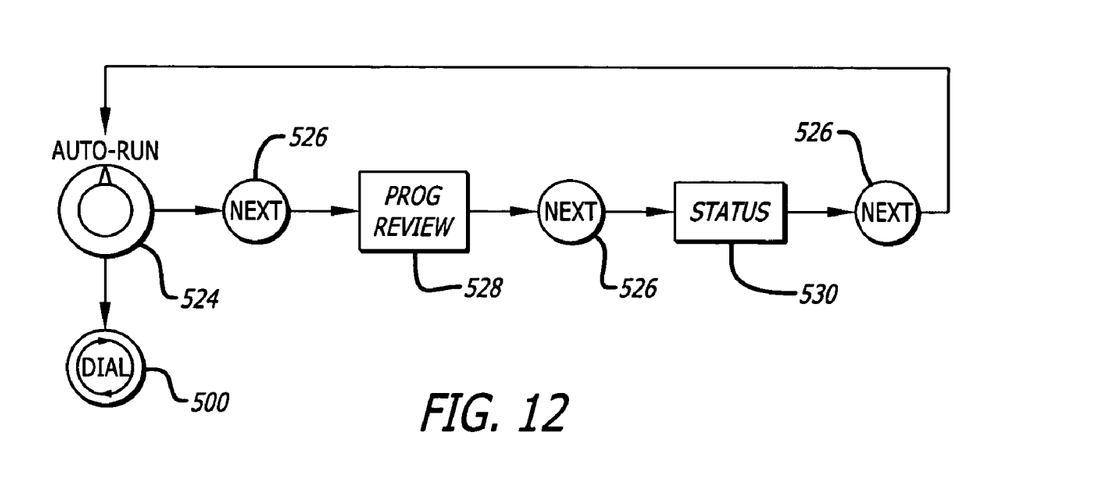
FIG. 12 is a block diagram of another programming aspect of an irrigation controller in accordance with a preferred embodiment of the present invention.

FIG. 12 illustrates a flow chart of the "Auto-run" function of present invention. The "Auto-run" function is used to provide information regarding the controller's operation as well as for reviewing all data stored in the irrigation programs. For example, a preferred embodiment of the present invention includes the current time and day, all programs in OFF position, active rain delay, suspension due to sensor input, and power failure.

In a preferred embodiment, a user may press the dial button 500 until the opaque arm 104 of virtual dial 100 points to "Auto-run" 524. Once in "Auto-run" 524 mode, the user presses the next 526 button, activating the program review mode 528. As above, the information of this mode may be cycled through using the +/ON and −/OFF buttons. By pressing next 526 yet again, status mode 530 may be activated. The +/ON and −/OFF similarly allow the user to cycle through the display data. Pressing the next button 526 once more brings the controller 108 back into the first mode, program review 528. In this manner the modes of the "Auto-run" 524 position may be cycled through.

Figure 13:
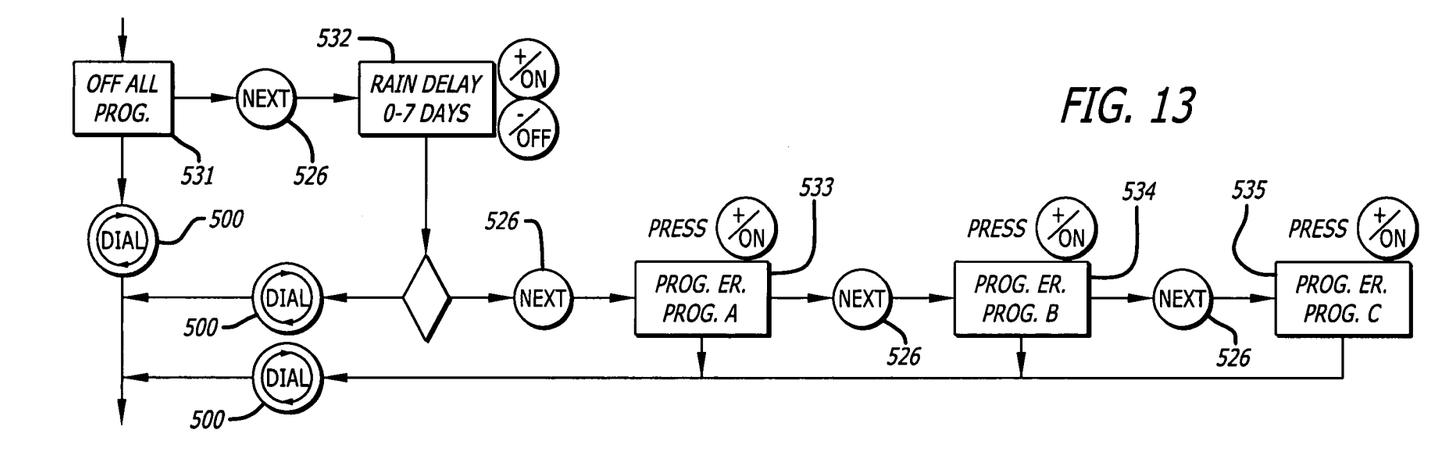
FIG. 13 is a block diagram of another programming aspect of an irrigation controller in accordance with a preferred embodiment of the present invention; and, FIG. 14 is a block diagram of another programming aspect of an irrigation controller in accordance with a preferred embodiment of the present invention.

FIG. 13 shows a flow chart of a System Off mode (not presented in FIG. 11). The System Off mode provides three main functions: to shut all irrigation down, to provide a rain delay, and to erase all parameters of a specific program. As seen in the flow chart, OFF All Program mode 531 stops all irrigations activities as long as the dial remains in that position. Pressing the Next 526 button moves the controller 108 into rain delay mode, which can be set for 0-7 days using the +/ON and −/OFF buttons. The remaining modes, Program Erase A 533, Program Erase B 534, and Program Erase C 535 may be accessed by pressing Next 526 once, twice or three times respectively. Pressing the +/ON and −/OFF buttons in any of these modes will erase all stored parameters for each respective program. The Dial 500 button may be pressed at any time within the modes to switch to the next dial mode.

One of the advantages of the virtual dial as opposed to a rotary dial of the prior art is improved efficiency in programming run times, watering days and start times into various watering programs of the controller. For example, a user can program three different watering programs into the controller 108. For each parameter in each program (e.g., run time, water day, start time), the user pushes the virtual dial advancement button (e.g., the "dial" button 102 or the "arrow" button 202).

After the last parameter is entered (e.g., the start time) for, say, Program A, the user will likely want to enter the parameters for Program B. In order to do this, the user presses the "program" button to activate the memory for Program B and the user will desire to start entering the first parameter for Program B (e.g., run time). With the present invention, upon pushing the "program" button to move to Program B after entering the last parameter for Program A (start times), the virtual dial is automatically switched to the mode for the first parameter (e.g., run time) from the mode for the last parameter entered for Program A (start times). This avoids the step of the user having to press the virtual dial advancement button to the "run times" mode before beginning to program the parameters for Program B.

This automatic operation is not available on a controller that utilizes a conventional prior art rotary switch. After finishing with Program A, the user has to remember to manually move the rotary switch to the "run time" mode (i.e., the first parameter) before beginning to enter the set up data for Program B. Through the use of a virtual dial, this step can be automated and the user need not think about it.

The virtual dial of the present invention also improves over previous mechanical rotary switches insofar as the user need not look at the LCD display 106 (or anywhere else on the controller face) to know what program is currently active for programming or for use. In the virtual dial in accordance with one embodiment of the present invention, such information is readily available on the virtual dial itself, e.g., the LCD indicia of Program "A," "B," or "C" in the center of the virtual dial.

With previous mechanical rotary dials, irrigation mode angles were limited by the type of rotary knob switched used for the dial. For example, a rotary knob with 12 stops typically evenly spaces these stops 30° apart from each other. Such rigid stop placement requirements add difficulty for the cover design of the irrigation controller since mode descriptions must precisely line up with the knob. Further, a graphic designer is creatively limited from more appealing mode description alternatives.

The virtual rotary dial 100 allows a designer greater flexibility with the degree of the arm separation, as well as the alignment of the arms 104. For example, arms 104 may be placed at irregular intervals around the dial. The location of the arms (or other indicators) can be configured in any manner and can be designed into a Liquid Crystal Display.

Another advantage of the present invention allows the irrigation controller 108 of the present invention to be programmed to restrict or "skip over" certain arms 104, depending on programmer defined variables, operation modes, or different station counts. This feature provides added programming flexibility since not all dial modes necessarily need to be active. This allows for making changes to the controller without having to make wholesale changes to the controller design.

For example, it is conceivable that certain water restrictions in a particular area could require a second set of run times each month. In order for a mechanical dial type of controller that doesn't already have the capability of indicating this "second" run function, it will be necessary for changes in the design of the controller, e.g., likely requiring a larger mechanical dial and a new circuit board. With the present invention, however, it is possible to simply activate an otherwise dormant portion of the virtual dial (that could be designed into the virtual dial) through a simple software change in the controller, thus only requiring a modification to the face plate of the controller, i.e., thus only requiring a cosmetic change.

Similarly, it is conceivable that a segment of the market does not require all the potential functions of the basic controller design. For example, a large portion of the market may not need to use any more than 4 irrigation stations. It is quite burdensome to provide a unique mechanical dial for each station count of a controller (e.g., 4, 6, 12, etc.), hence, the prior art usually provides a controller with one mechanical dial which always shows the maximum number stations possible for that controller design, regardless of whether all the stations can actually be used with that controller. This can be confusing to the user. With the virtual dial of the present invention, however, the virtual indicators for unused stations can simply be placed into a dormant state through a minor software change. This way, the user does not see any indicia for these unused stations and thus potential confusion is eliminated.

In another embodiment of the invention, a color display may be used for the virtual rotary dial 100. The color LCD display allows each arm 104 to energize, reflecting a color of the programmer's choice. Any dynamic color display known in the art may be used, especially color LCD's or organic light-emitting diodes (OLED's). Thus, each arm 104 may display additional information over a virtual rotary dial with black and white functionality only.

A further advantage of the virtual rotary dial controller allows for waterproofing of the dial area. Mechanical rotary dials and switches protrude from an opening in the controller box. Although this opening may be sealed, time and exposure to the elements prevent reliable long term waterproofing. Since the virtual rotary dial lacks a mechanical dial and its associated controller box opening, long term waterproofing is easily achieved by standard sealing methods known in the art.

In a further aspect of the invention, it should be recognized that prior art mechanical dials cannot, by their very nature, display information that is changed by other operations of the controller. Mechanical dials can only indicate a position on the face of the controller. All other information that may be changed by other operations must be obtained from either the LCD display or by other indicia on the face of the controller.

With a virtual dial controller in accordance with the present invention, however, such information can be displayed and changed in the virtual dial itself. For example, the virtual dial itself indicates which program is currently operative. In the prior art, a mechanical dial cannot show this data. The program that is operative for the mechanical dial must be displayed somewhere else on the controller. This aspect of the present invention further simplifies the programming function of the controller.

Other advantages to the present invention will also be apparent to the reader over the prior art. Moreover, the specific embodiments disclosed herein are not intended to be limiting of the invention but only exemplary.

What is claimed is:

1. An electronic irrigation controller comprising:
 a controller housing;
 a microprocessor disposed on said controller housing;
 an input device operable to selectively change an irrigation control mode of said microprocessor;
 a first electronic display having energizable indicia corresponding to each selected irrigation control mode of said input device;

a second electronic display having energizable indicia corresponding to programming information for each irrigation control mode indicated on said first electronic display; and, said energizable indicia of said first electronic display being the sole visual indicator of said selected irrigation control mode of said input device, wherein said energizable indicia of said second electronic display unit are disposed in a substantially circular arrangement so as to simulate a rotary dial.

2. The irrigation controller of claim 1, wherein said second electronic display is a virtual dial.

3. The irrigation controller of claim 1 wherein said second electronic display further includes energizable indicia corresponding to a plurality of irrigation programs programmable by said controller.

4. The irrigation controller of claim 1, wherein said second electronic display is a liquid crystal display.

5. The irrigation controller of claim 1 wherein said second electronic display comprises multiple L.E.D.s.

6. The irrigation controller of claim 1, wherein said controller housing includes control text proximately applied to said second electronic display; said control text conveying each available irrigation control mode.

7. The irrigation controller of claim 1, wherein said controller housing has a front surface that is substantially flat.

8. An irrigation controller comprising:
a programmable processing unit operable to execute an irrigation program;
an input surface connected to said processing unit, said input surface operable to cause a change in a control state of said processing unit;
an electronic display operatively connected to said processing unit and said input surface so as to display a current control state of said processing unit; and,
said electronic display being sized and shaped to simulate a mechanical rotary dial on a face of said controller,
wherein said electronic display comprises multiple L.E.D.s arranged in a share of a circle.

9. The irrigation controller of claim 8, wherein said input surface is a push button.

10. The irrigation controller of claim 8, wherein said electronic display further comprises a liquid crystal display.

11. The irrigation controller of claim 9, wherein said electronic display includes energizable indicia corresponding to each of a possible control state of said processing unit.

12. The irrigation controller of claim 9 wherein said electronic display includes energizable indicia corresponding to each of a plurality of programmable irrigation programs.

13. A method of programming an irrigation system comprising;

providing an electronic irrigation controller having an electronic display with energizable indicia corresponding to a selected control state and to a selected watering program of said controller;

selecting a first watering program for programming;

observing the selection of said first watering program in said electronic display;

electronically selecting a first control state of said controller and observing corresponding energized indicia in said electronic display;

inputting program parameters corresponding to said selected first control state into said controller;

electronically selecting a second control state of said controller and observing corresponding energized indicia in said electronic display;

inputting program parameters corresponding to said selected second control state into said controller;

observing said inputting of program parameters by viewing a substantially circular arrangement of energizable indicia of said electronic display: and, continuing the selecting of control states and the inputting of program parameters until programming of said first watering program is complete.

14. A method according to claim 13, further comprising the selecting of a second watering program for programming wherein said selecting of said second watering program automatically entails the selection of said first control state for said second watering program.

15. A method according to claim 14, wherein the selecting of said second watering program and the automatic selection of said first control state for said second watering program includes observing corresponding energized indicia in said electronic display.

16. A method according to claim 13, wherein the selected first control state is the state governing a run time of each irrigation station of said first watering program.

17. A method according to claim 14, wherein the first control state is the state governing a run time of each irrigation station.

18. A method according to claim 13, wherein the observing of said energizable indicia includes observing energized portions of a display that simulates a mechanical dial.

19. A method according to claim 18, wherein the observing of said energizable indicia includes observing energized portions of a liquid crystal display.

20. A method according to claim 18, wherein the observing of said energizable indicia includes observing energized L.E.D.'s.

* * * * *